Dec. 30, 1941.  F. BOYAN ET AL  2,267,854
CHECKROW CORN PLANTER
Filed May 15, 1940  2 Sheets-Sheet 1
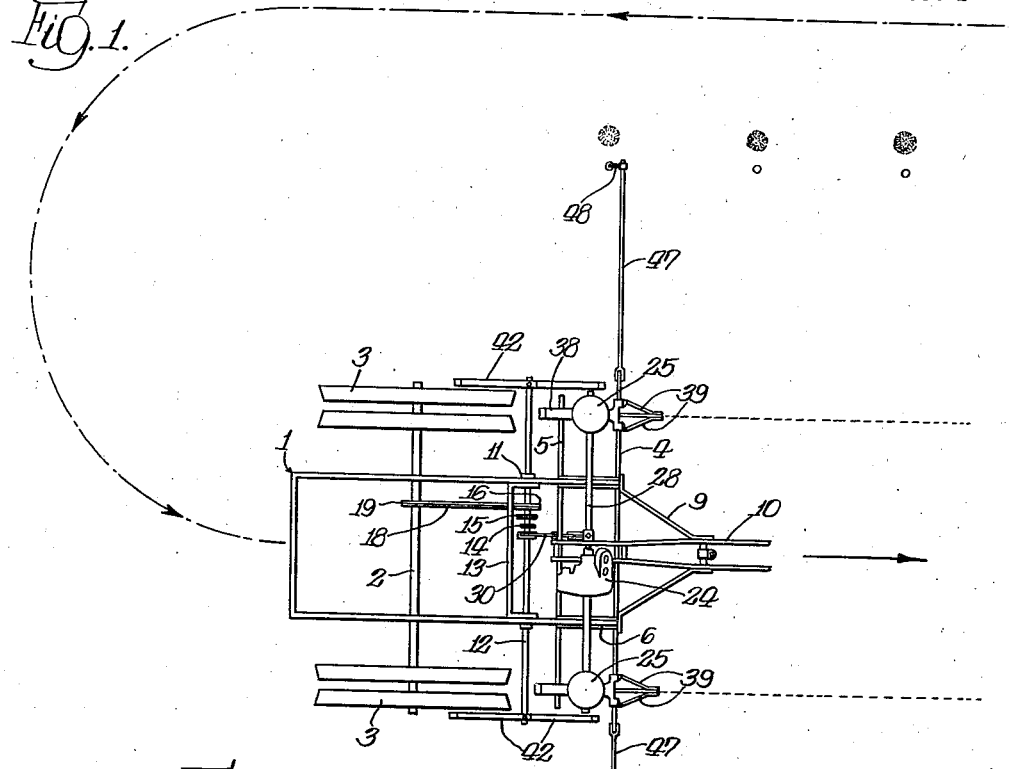
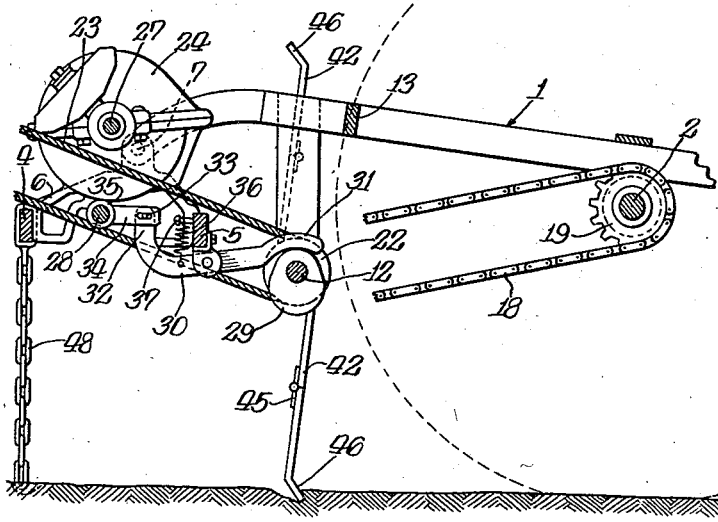
INVENTORS.
Frank Boyan,
George C. Kalb,
BY W. F. Kellogg
ATTORNEY.

INVENTORS.
Frank Boyan,
George C. Kalb,
W. F. Kellogg
ATTORNEY.

Patented Dec. 30, 1941

2,267,854

UNITED STATES PATENT OFFICE 2,267,854

CHECKROW CORN PLANTER

Frank Boyan, Waterford, and George C. Kalb, Rochester, Wis.

Application May 15, 1940, Serial No. 335,208

2 Claims. (Cl. 111—32)

This invention relates to improvements in check row corn planters, having for an object to provide a planter of this type whereby the planting of seeds in equi-distant longitudinally spaced relation is effected without the usage of so-called check wires, the dropping of the seeds being automatically accomplished through the operation of means wholly contained or carried by the planter.

It is moreover an object of the invention to provide a planter of the stated character which, in operation, will automatically effect the dropping of seeds at regular intervals and distances and too, cause the planted hills to be clearly marked for facilitating alignment of subsequently planted hills therewith, hence, insuring the uniform planting of a field in relatively hill longitudinal and transverse alignment.

Another object of the invention is to provide the planter with means whereby the seed dropping mechanism of the same may be selectively adjusted so that longitudinal spacing of the planted seeds will be uniformly effected at different distances apart, thus enabling a user to optionally increase or decrease the density or relative longitudinal spacing of said plantings in a field, i. e., increase or decrease the spacing between the planted hills of the field transverse rows.

Other objects of the invention will be in part obvious and in part pointed out hereinafter.

In order that the invention and its mode of operation may be readily understood by those skilled in the art to which it appertains, we have in the accompanying drawings and the detailed description based thereupon, set out one embodiment of our invention.

In these drawings:

Figure 1 is a plan view of my improved planter.

Figure 3 is a fragmentary vertical longitudinal section taken on line 3—3 of Figure 2, looking in the direction in which the arrows point, and Figure 4 is a fragmentary detail, partly in section, illustrating the mounting of the rotatable hill marking devices and the hinged sectioning of one thereof.

Figure 2:
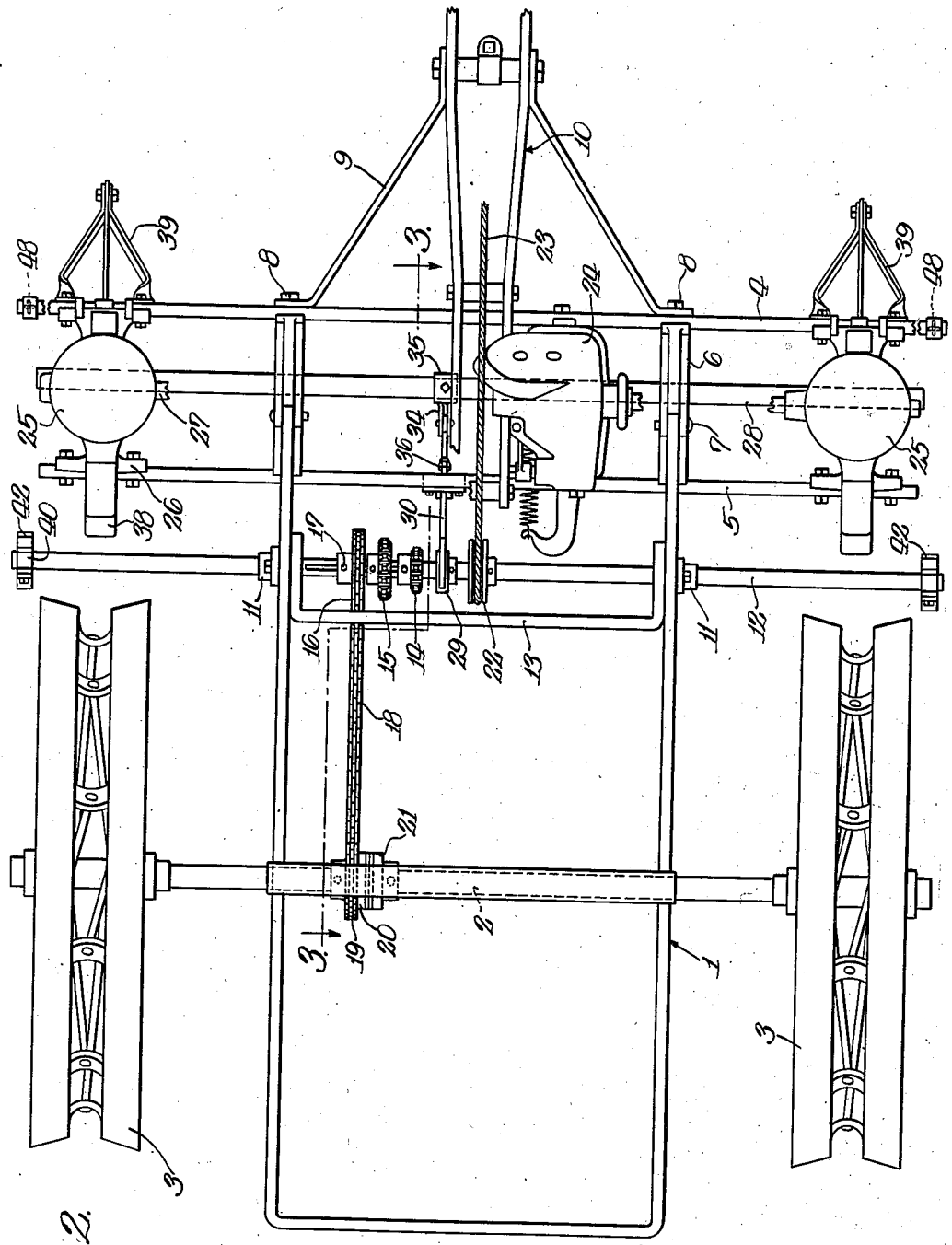
Figure 2 is an enlarged top plan view of the same.

Having particular reference to the drawings in connection with which like characters of reference will designate corresponding parts throughout, our improved planter may be stated to comprise a frame 1 of metal or other suitable material, substantially rectangular in formation, having suitable bearings in the normally rearward portion thereof in which a live or rotatable axle is transversely journalled; wheels 3 being fixedly mounted upon the opposite or bearing portions of such axle beyond the adjacent sides of said frame 1. Sill bars 4 and 5 are fixedly mounted transversely of the normally forward portion of the frame 1, as shown in Figure 2 of the accompanying drawings and, of course, are suitably secured to adjacent portions of the opposite sides of said frame 1. The sill bars 4 and 5, as will be noted, are of lengths greater than the width of the normally forward portion of the frame 1, and in consequence, extend for distances beyond its opposite sides. Connection between the forward extremities of the opposite sides of the frame 1 and the sill bars 4 and 5 is preferably effected by means of brackets 6, the adjacent ends of which are secured to the forward extremities or ends of the frame sides, as at 7, while their remaining or forward extremities are secured to said sill bars 4 and 5, as at 8. Also, suitable angle braces 9 are connected to the sill bar 4 through the medium of the connecting means 8 and extend into fixed engagement with a suitable type of draft connection, generally designated by the numeral 10, having the rearward portion of the same engaged with appropriate or adjacent portions of the sill bars 4 and 5, as illustrated by Figures 1 and 2 of the accompanying drawings.

Journalled in suitable bearings depending from and supported by the opposite sides of the frame 1, as at 11, is a transversely disposed counter or driven shaft 12, whose length is greater than the width of the frame 1 and therefore, has its opposite end portions extended beyond the adjacent sides of said frame, for a purpose which will be subsequently described. That portion of the frame 1 in proximity to the mounting or arrangement of the counter or driven shaft 12 is equipped with a substantially U-shaped frame brace 13, the opposite legs of which have fixed connection with adjacent portions of the frame sides.

A plurality of different sized sprocket wheels, indicated by the numerals 14, 15 and 16 are splined upon a portion of the countershaft 12 between the opposite sides of the frame 1 and each is adapted to be locked in particular longitudinally adjusted position upon such shaft through the medium of locking keys or similar devices, generally designated by the numeral 17. These differently sized sprocket wheels 14, 15 and 16 are adapted to be selectively driven or rotated by the engagement of a sprocket chain 18 about the particularly selected one of the group; the opposite end of the sprocket chain being engaged about a sprocket wheel 19, carried by a suitable type of slip clutch element 20 loosely mounted on the axle 2 and normally engaging a companionate clutch element 21 having fixed connection and mounting upon said adjacent portion of said axle. Thus, when the axle 2 is rotated in clock-wise direction, the clutch elements 20 and 21 will be interengaged. In consequence, the sprocket wheel 19 will be rotated causing the sprocket chain 18 to be driven, thereby transmitting rotary motion to the particular splined or slidably mounted sprocket wheel 14, 15 or 16 carried by the countershaft 12. By selective longitudinal adjustment of any one of the sprocket wheels 14, 15 or 16 upon the countershaft 12, it will be understood that the same will be brought into longitudinal alignment with the sprocket wheel 19 driven from the axle 2. Therefore, the normally forward end of the sprocket chain 18 may be effectually engaged about the particularly selected sprocket wheel 14, 15 or 16 whereby to rotate the same and the countershaft 12. Thus, with change of positioning of the sprocket wheels 14, 15 or 16 upon the countershaft 12, different driving relationships and speed ratios will be developed between the axle 2 and the counter or driven shaft 12, whereby the latter may be caused to rotate at increased or decreased velocities.

Fixedly mounted upon an intermediate portion of the countershaft 12, between the opposite sides of the frame 1, is a pulley or sheave 22 about which a cable 23 is passed, said cable extending forwardly and longitudinally of the frame 1 to a point convenient for engagement thereof by a planter operator.

Mounted upon intermediate portions of the sill bars 4 and 5, within the frame 1, is a suitable type of gear casing 24, provided with motion or power transmitting gears, the characters of which are well known in the art, having conventional connection (not shown) with the planter's wheels or axle whereby motion will be transmitted thereto.

Seed hoppers, severally indicated by the numeral 25, are mounted on the outer extremities of the sill bars 4 and 5 by means of suitable supporting brackets 26 and are adapted, as will be understood, to receive and discharge therefrom the seed corn to be planted. Drill shafts 27 are operably connected to the seed dropping mechanism (not shown) of each of the hoppers 25 and extend into driving relationship with respect to the gearing provided in the gear casing 24.

Journalled in bearings provided in the forward portion of the frame 1 and disposed transversely of the same is a seed hopper shaft 28, the opposite ends of which have driving connection with certain of the seed dropping mechanism of the several seed hoppers 25, whereby seeds, in desired numbers or quantities, will be permitted to be discharged thereby for planting.

In order that oscillatory motion will be transmitted to the shaft 28 from the countershaft 12 in a manner to effect proper operation of the seed dropping mechanism of the several seed hoppers 25, we fixedly mount an eccentric or cam element 29 upon an intermediate portion of the countershaft 12. Pivotally mounted upon an adjacent portion of the sill bar 5, in longitudinal alignment with the fixedly mounted cam 29, is a lever 30, the normally rearward portion of which is of substantially arcuate formation, as at 31, and is disposed directly over said cam 29; the normally forward portion of said lever 32 having slotted pivotal connection, as at 33, with the adjacent end of an arm 34 fixedly mounted upon a collar 35, which in turn, is received on and connected to an adjacent portion of the shaft 28. A contractile coil spring 36 is secured to an inner portion of the sill bar 5, as at 37, and has its opposite end secured to the normally forward portion of the lever 30. Hence, it will be understood that a normally upward pull will be imparted to said forward portion of the lever 30 causing its normally rearward portion provided with the arcuate extension 31 to be urged downwardly for constant engagement with the peripheral section of the cam 29 carried by the countershaft 12. From the foregoing, it will be understood that with rotation of the counter or driven shaft 12 in a clock-wise direction, the cam 29 will correspondingly rotate and will thereby cause the normally rearward portion of the lever 30 provided with the arcuate extension 31 to be intermittently raised and lowered, thus transmitting an intermittent downward pull and upward thrust to the arm 34 fixedly mounted on the seed hopper shaft 28. Thus, said seed hopper shaft 28 will be intermittently oscillated and this oscillatory motion will be transmitted to the seed hopper dropping mechanism of the several seed hoppers 25 whereby to effect intermittent dropping or release of seeds from said hopper into the discharge elements or portions of the planter runners.

As above indicated, each of the seed hoppers 25 is provided with planter runners indicated by the numeral 38, of conventional or well known construction and design, the runners being cooperatively associated with respect to the seed hoppers and suitably braced with respect to the sill bars 4 and 5 through the medium of runner braces generally indicated by the numeral 39.

As hereinbefore stated, the opposite ends of the shaft 12 are extended for distances beyond the opposite sides of the planter frame 1. These opposite ends will, preferably, extend for distances slightly beyond or outwardly of the wheels 3 of the planter and each thereof is provided with suitable brackets or mounting devices 40 having substantially flat oppositely disposed attaching pieces 41. Oppositely disposed arms 42 having relatively equi-spaced longitudinal slots 43 formed in their inward portions are attached to the flat engaging pieces 41 of the mounting device 40 through the medium of bolts or other suitable fastening devices 44 engaging through such attaching pieces and through the slots 43 of said arms. It will be thus seen that radially adjustable mounting of the oppositely disposed arms 42 with respect to the countershaft 12 will be permitted through slidable mounting of said arms upon the flat engaging pieces 41 of the mounting device 40. Each of the arms 42 is composed of sections, the meeting or adjacent ends of which are hingedly interconnected and are normally retained in relative parallelism through the medium of spring means 45 carried adjacent their hinged connections and having bearing upon adjacent portions of the same. The free ends of the outermost sections of the arms 42 are each equipped with earth engaging means, generally indicated by the numeral 46, which means are adapted to be engaged in the earth over which the planter passes to depths sufficient to mark the same, for a purpose which will subsequently be described. If, however, during the rotation of the arms 42 in a clock-wise direction, the earth engaging portions 46 thereof should strike or come into engagement with some foreign object, such for example as a rock, etc., it will be understood that the spring pressed hingedly connected outer sections thereof will be permitted to yieldingly engage and pass over the same, hence, avoiding breaking or doing of other damage thereto.

Extensions 47 are rigidly carried upon the opposite extremities of the forward sill bar 4 of the planter in substantial alignment therewith and have lengths of chain 48 or flexible means connected to the outer ends of each thereof and depending therefrom; the lengths of the chains being such that their lower ends are disposed in proximity to the soil and serve as indicating devices to the planter operator whereby he may transversely align the planter with previously planted hills for the beginning and following through the planting of a new row with planted hills in transverse and longitudinal alignment with those previously planted.

In operation of our improved planter, the planter operator rotates the countershaft 12 by imparting pull in counter-clockwise direction to the cable 23 engaged over the sheave 22, so that one of the hill marking arms 42, mounted on the opposite ends thereof will be so positioned that it will engage with the earth or soil upon following rotation of the same and the countershaft 12, in spaced relation to and in alignment with that particularly previously planted hill laterally of the planter, adjacent which the free or lower end of one of the indicator chains 48 is then arranged. Because of the provision of the slip clutch comprised by the elements 20 and 21, it will be understood that reverse rotation of sprocket chain 18 through the particular sprocket wheel 14, 15 or 16 connected therewith and arranged upon the countershaft 12, will be permitted, i. e., the countershaft with said sprocket wheels 14, 15 and 16 may be rotated in a reverse or counter-clockwise direction under urge of the cable 23 without interference from the axle 2.

As the planter is drawn over a predetermined course on the field, for the check row planting of seeds, the live axle 2 will transmit rotary motion to the countershaft 12 through that particular sprocket wheel 14, 15, or 16 engaged by the sprocket chain 18. Accordingly, the cam element 29 engaging the arcuate portion 31 of the lever 30 will be rotated in a clock-wise direction and will rock said lever 30. Such engagement will cause the opposite or normally forward end of the lever 30 to be moved downwardly and hence, impart downward pull to the adjacent end of the arm 34 fixedly mounted on the shaft 28. The shaft 28 will be rocked and effect operation of the seed dropping mechanism (not shown) of the seed hoppers 25 to effect the dropping or release of seeds therefrom for planting. The planter runners 38, as is usual, will effect covering of the dropped seed with soil.

Following rocking of the shaft 28 under influence of the lever 30 and the arm 34 pivotally connected thereto, it will be understood that said lever, and in consequence, the shaft 28, will be automatically returned to their initial or starting position by means of the contractile coil spring 36 connected to the forward portion of said lever 30, hence, rendering the same ready for further intermittent rocking of the shaft 28 and repeated seed dropping or release and planting operations.

Should it be desired to effect relatively longer or shorter spacing between the check row planting of seeds, i. e., hills planted at greater or lesser distances apart, it will be understood that this may be selectively effected by increasing or decreasing the speed of rotation of the countershaft 12 through the selective positioning of the sprocket wheels 14, 15 or 16 for connection with the normally forward end of the sprocket chain 18.

Manifestly, the construction shown is capable of modification, and such modification as is within the scope of our claims, we consider within the spirit of our invention.

We claim:

1. A corn planter, including a wheeled frame, a countershaft mounted transversely of a portion of said frame, means for selectively transmitting rotary motion at predetermined velocities to said countershaft from the frame wheels, an oscillatable shaft mounted transversely of the frame in spaced relation to said countershaft, a lever mounted upon the frame between said countershaft and oscillatable shaft, a cam element fixedly mounted on the countershaft engaging with one end portion of said lever, means fixedly mounted on said oscillatable shaft pivotally connected to the opposite end of said lever, spring means for normally imparting an upward pull to the pivotally connected end of said lever, and seed hoppers on the frame having their respective seed release means operatively connected to said oscillatable shaft.

2. A corn planter, including a wheeled frame, a countershaft mounted transversely of a portion of the frame, means for transmitting rotary motion to said countershaft from the frame wheels, a transversely disposed oscillatable shaft on the frame in spaced relation to said countershaft, a lever mounted on the frame between said countershaft and oscillatable shaft, one end portion of said lever being provided with an arcuate bearing portion, a cam element fixedly carried by the countershaft engaging the arcuate bearing portion of said lever, fixed means on the oscillatable shaft pivotally connected to the opposite end of said lever, and seed hoppers on the frame having their respective seed release means operatively connected to said oscillatable shaft.

FRANK BOYAN.
GEORGE C. KALB.